US012584226B2

(12) United States Patent
Nakagawa et al.

(10) Patent No.: US 12,584,226 B2
(45) Date of Patent: Mar. 24, 2026

(54) ELECTRICAL STEEL SHEET WITH INSULATING COATING

(71) Applicant: JFE STEEL CORPORATION, Tokyo (JP)

(72) Inventors: Nobuko Nakagawa, Tokyo (JP); Chiyoko Tada, Tokyo (JP); Naoki Muramatsu, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1008 days.

(21) Appl. No.: 17/754,950

(22) PCT Filed: Oct. 13, 2020

(86) PCT No.: PCT/JP2020/038678
§ 371 (c)(1),
(2) Date: Apr. 18, 2022

(87) PCT Pub. No.: WO2021/079791
PCT Pub. Date: Apr. 29, 2021

(65) Prior Publication Data
US 2023/0002908 A1 Jan. 5, 2023

(30) Foreign Application Priority Data
Oct. 21, 2019 (JP) ................................. 2019-192195

(51) Int. Cl.
| | |
|---|---|
| *C23C 22/50* | (2006.01) |
| *C08K 3/36* | (2006.01) |
| *C09D 7/61* | (2018.01) |
| *C09D 183/04* | (2006.01) |

(52) U.S. Cl.
CPC ............... *C23C 22/50* (2013.01); *C08K 3/36* (2013.01); *C09D 7/61* (2018.01); *C09D 183/04* (2013.01)

(58) Field of Classification Search
CPC ... C23C 22/50; C23C 18/1216; C23C 18/127; C08K 3/36; C09D 7/61; C09D 183/04; C09D 4/00; C09D 4/06; C09D 5/00; C09D 7/63; C09D 7/65; C09D 7/66; C09D 7/70; C09D 175/16; C09D 183/06; C09D 183/08; C08F 230/085; C08F 299/065; C08G 18/671; H01F 1/18; C08L 91/08
See application file for complete search history.

(56) References Cited

U.S. PATENT DOCUMENTS

| | | |
|---|---|---|
| 2010/0015339 A1 | 1/2010 | Morillo et al. |
| 2014/0014402 A1 | 1/2014 | Cho et al. |
| 2014/0186614 A1 | 7/2014 | Fujibayashi et al. |

FOREIGN PATENT DOCUMENTS

| | | |
|---|---|---|
| CN | 103540102 A | 1/2014 |
| CN | 103732794 A | 4/2014 |
| CN | 105505294 A | 4/2016 |
| CN | 105934459 A | 9/2016 |
| EP | 1967612 A1 | 9/2008 |
| EP | 3282039 A1 | 2/2018 |
| EP | 3730562 A1 | 10/2020 |
| JP | 2006054244 A | 2/2006 |
| JP | 2013064195 A | 4/2013 |
| JP | 2014025139 A | 2/2014 |
| JP | 2017186542 A | 10/2017 |
| KR | 1020160042295 A | 4/2016 |
| TW | 201311435 A | 3/2013 |
| WO | 2013031200 A1 | 3/2013 |
| WO | 2019123885 A1 | 6/2019 |

OTHER PUBLICATIONS

CN 105505294 English machine translation (Year: 2016).*
Aug. 16, 2021, Office Action issued by the Taiwan Intellectual Property Office in the corresponding Taiwanese Patent Application No. 109136076 with English language Search Report.
Dec. 15, 2020, International Search Report issued in the International Patent Application No. PCT/JP2020/038678.
Dec. 7, 2021, Notification of Reasons for Refusal issued by the Japan Patent Office in the corresponding Japanese Patent Application No. 2021-510999 with English language Concise Statement of Relevance.
Nov. 25, 2022, the Extended European Search Report issued by the European Patent Office in the corresponding European Patent Application No. 20878242.5.
Dec. 28, 2023, Office Action issued by the China National Intellectual Property Administration in the corresponding Chinese Patent Application No. 202080073166.X with English language search report.

* cited by examiner

*Primary Examiner* — Blaine Copenheaver
(74) *Attorney, Agent, or Firm* — KENJA IP LAW PC

(57) ABSTRACT

Disclosed is an electrical steel sheet with an insulating coating formed by applying a surface-treatment agent to at least one surface of the electrical steel sheet and drying the surface-treatment agent, wherein the surface-treatment agent contains: certain trialkoxysilane and/or dialkoxysilane (A); a silane coupling agent (B) that does not contain a polymerizable unsaturated group in its structure; plate-like silica (C); a polymerizable unsaturated-group-containing compound (D); and water, within a range satisfying the following conditions (1) to (3): (1) a mass ratio (A/B) of (A) to (B) is from 0.05 to 1.00; (2) a content of (C) is 2 mass % to 30 mass % with respect to a total mass of (A) to (D) in the surface-treatment agent; and (3) a content of (D) is 2 mass % to 18 mass % with respect to the total mass of (A) to (D) in the surface-treatment agent.

2 Claims, No Drawings

ELECTRICAL STEEL SHEET WITH INSULATING COATING

TECHNICAL FIELD

This disclosure relates to an electrical steel sheet with an insulating coating, and in particular to an electrical steel sheet with an insulating coating having excellent adhesive compatibility, which is suitable for use as a raw material for iron cores of automobile motors or electric equipment, and which is suitable for use in forming a core by bonding electrical steel sheets together with an anaerobic acrylic adhesive.

BACKGROUND

Conventionally, laminated electrical steel sheets used for iron cores of automobile motors and electrical equipment are produced by stacking multiple electrical steel sheets with an insulating coating and then integrating them by, for example, caulking or welding. In recent years, there has been an increasing demand for higher efficiency in electrical equipment to save energy. Accordingly, there is a tendency to make the thickness of each electrical steel sheet in a laminated electrical steel sheet thinner to reduce eddy current loss. However, as the electrical steel sheets used become thinner, not only caulking or welding becomes more difficult, but also the laminated electrical steel sheet tends to open at an end face, making it difficult to maintain the shape of the iron core.

To address this issue, the following two technologies have been proposed instead of the technology of integrating electrical steel sheets by caulking or welding. One is a technology in which a laminated electrical steel sheet is formed by thermo-compression bonding multiple electrical steel sheets with adhesive insulating coating formed on the surfaces. The other is a technology in which a laminated electrical steel sheet is formed by applying an adhesive to electrical steel sheets with an insulating coating and bonding them together. It is known that anaerobic acrylic adhesives are frequently used as adhesives applied to the latter technology.

JP2013-64195A (PTL 1) describes an "electrical steel sheet with an insulation coating formed by applying a surface-treatment agent to at least one side of the electrical steel sheet and drying the surface-treatment agent, wherein the surface-treatment agent contains trialkoxysilane and/or dialkoxysilane (A) in which a substituent other than an alkoxy group bound to Si is constituted only by at least one non-reactive substituent selected from hydrogen, an alkyl group, or a phenyl group; a silane coupling agent (B), at a mass ratio (A/B) of 0.05 to 1.0; and plate-like silica (C) having an average particle size of 0.08 μm to 0.9 μm and an aspect ratio of 10 to 100, wherein the content of the plate-like silica is 2 mass % to 30 mass % with respect to a total solid content of the surface-treatment agent". Since this insulating coating does not have an adhesive function, it may be applicable to the latter technology.

CITATION LIST

Patent Literature

PTL 1: JP2013-64195A

SUMMARY

Technical Problem

The electrical steel sheet with an insulating coating described in PTL 1 has good corrosion resistance and tension pad resistance required of electrical steel sheets in recent years, even without containing a chromium compound in the insulating coating. As used herein, the "tension pad resistance" means the resistance to peeling of the insulating coating when the surface of the insulating coating is rubbed with a felt-like tension pad used to hold down the electrical steel sheet in order to slit the coil.

However, according to our examination, it was found that the electrical steel sheet with an insulating coating described in PTL 1 could not sufficiently obtain adhesion strength to an anaerobic acrylic adhesive, and that there was room for improvement in this respect.

It would thus be helpful to provide an electrical steel sheet with an insulating coating that is excellent in adhesion strength to an anaerobic acrylic adhesive, corrosion resistance, and tension pad resistance.

Solution to Problem

As a result of our diligent study, it was found that a surface-treatment agent for forming an insulating coating on an electrical steel sheet can address the above issues by containing, as components of the surface-treatment agent, a silane coupling agent as a main component, trialkoxysilane and/or dialkoxysilane, plate-like silica, and a certain amount of a polymerizable unsaturated-group-containing compound.

The present disclosure was completed based on these discoveries, and primary features thereof are as described below.

[1] An electrical steel sheet with an insulating coating formed by applying a surface-treatment agent to at least one surface of the electrical steel sheet and drying the surface-treatment agent, wherein the surface-treatment agent contains:

trialkoxysilane and/or dialkoxysilane (A) in which a substituent other than an alkoxy group bound to Si consists of at least one non-reactive substituent selected from hydrogen, an alkyl group, or a phenyl group;

a silane coupling agent (B) that does not contain a polymerizable unsaturated group in its structure;

plate-like silica (C) having an average particle size of 0.08 μm to 0.9 μm and an aspect ratio of 10 to 100;

a polymerizable unsaturated-group-containing compound (D); and water, within a range satisfying the following conditions (1) to (3):

(1) a mass ratio (A/B) of the trialkoxysilane and/or the dialkoxysilane (A) to the silane coupling agent (B) is from 0.05 to 1.00;

(2) a content of the plate-like silica (C) is 2 mass % to 30 mass % with respect to a total mass of (A) to (D) in the surface-treatment agent; and (3) a content of the polymerizable unsaturated-group-containing compound (D) is 2 mass % to 18 mass % with respect to the total mass of (A) to (D) in the surface-treatment agent.

[2] An electrical steel sheet with an insulating coating formed by applying a surface-treatment agent to at least one surface of the electrical steel sheet and drying the surface-treatment agent, wherein the surface-treatment agent contains:

trialkoxysilane and/or dialkoxysilane (A) in which a substituent other than an alkoxy group bound to Si consists of at least one non-reactive substituent selected from hydrogen, an alkyl group, or a phenyl group;

a silane coupling agent (B) that does not contain a polymerizable unsaturated group in its structure;

plate-like silica (C) having an average particle size of 0.08 μm to 0.9 μm and an aspect ratio of 10 to 100;

a polymerizable unsaturated-group-containing compound (D);

a lubricant (E); and water, within a range satisfying the following conditions (1) to (4):

(1) a mass ratio (A/B) of the trialkoxysilane and/or the dialkoxysilane (A) to the silane coupling agent (B) is from 0.05 to 1.00;

(2) a content of the plate-like silica (C) is 2 mass % to 30 mass % with respect to a total mass of (A) to (E) in the surface-treatment agent;

(3) a content of the polymerizable unsaturated-group-containing compound (D) is 2 mass % to 18 mass % with respect to the total mass of (A) to (E) in the surface-treatment agent; and (4) a content of the lubricant (E) is 0.5 mass % to 20 mass % with respect to the total mass of (A) to (E) in the surface-treatment agent.

Advantageous Effect

The electrical steel sheet with an insulating coating disclosed herein is excellent in adhesion strength to an anaerobic acrylic adhesive, corrosion resistance, and tension pad resistance.

DETAILED DESCRIPTION

An electrical steel sheet with an insulating coating according to one of the embodiments of the present disclosure will be described below.

(Electrical Steel Sheet)

In the present disclosure, electrical steel sheets as the raw material are not particularly limited, and any known electrical steel sheets can be suitably used. In other words, general cold-rolled steel sheets such as so-called soft iron sheets (electrical core sheets) and SPCC with high magnetic flux density, and non-oriented electrical steel sheets containing Si or Al to increase specific resistance.

(Surface-Treatment Agent)

The surface-treatment agent (surface-treatment agent for electrical steel sheets) used in this embodiment contains: trialkoxysilane and/or dialkoxysilane (A) in which a substituent other than an alkoxy group bound to Si consists of at least one non-reactive substituent selected from hydrogen, an alkyl group, or a phenyl group; a silane coupling agent (B) that does not contain a polymerizable unsaturated group in its structure; plate-like silica (C) having an average particle size of 0.08 μm to 0.9 μm and an aspect ratio of 10 to 100; a polymerizable unsaturated-group-containing compound (D); water; and, optionally, a lubricant (E).

[Trialkoxysilane and/or Dialkoxysilane (A)]

The surface-treatment agent used in this embodiment contains trialkoxysilane and/or dialkoxysilane (A).

The type of trialkoxysilane is not particularly limited, and one or more of trialkoxysilanes represented by the general formula $R1Si(OR')_3$ can be used. R1 is a non-reactive substituent selected from hydrogen, an alkyl group, or a phenyl group. When R1 is an alkyl group, it is preferably a linear or branched alkyl group having 1 to 6 carbon atoms, and more preferably a linear or branched alkyl group having 1 to 3 carbon atoms. R' is an alkyl group, preferably a linear or branched alkyl group having 1 to 4 carbon atoms, and more preferably a linear or branched alkyl group having 1 to 2 carbon atoms. For example, methyltrimethoxysilane, ethyltrimethoxysilane, methyltriethoxy-silane, ethyltriethoxysilane, phenyltriethoxysilane, phenyltrimethoxysilane, or hydrolysates thereof can be used. Among them, a trialkoxysilane in which R1 is an alkyl group is preferable from the viewpoint that the corrosion resistance of the resulting electrical steel sheet is superior.

The type of dialkoxysilane is not particularly limited, and one or more of dialkoxysilanes represented by the general formula $R2R3Si(OR'')_2$ can be used. R2 and R3 are each non-reactive substituents selected from hydrogen, an alkyl group, or a phenyl group. When R2 and R3 are alkyl groups, they are preferably linear or branched alkyl groups having 1 to 6 carbon atoms, and more preferably linear or branched alkyl groups having 1 to 3 carbon atoms. R'' is an alkyl group, preferably a linear or branched alkyl group having 1 to 4 carbon atoms, and more preferably a linear or branched alkyl group having 1 to 2 carbon atoms. For example, dimethyldimethoxysilane, dimethyl-diethoxysilane, diphenyldimethoxysilane, or hydrolysates thereof can be used. Among them, dialkoxysilane in which R2 and R3 are alkyl groups is preferable from the viewpoint that the corrosion resistance of the resulting electrical steel sheet is superior.

[Silane Coupling Agent (B)]

The surface-treatment agent used in this embodiment includes a silane coupling agent (B) that does not contain a polymerizable unsaturated group in its structure. The type of silane coupling agent (B) is not particularly limited as long as it does not contain a polymerizable unsaturated group in its structure, and one or more of silane coupling agents represented by the general formula $XSi(R4)_n(OR)_{3-n}$ (where n is 0, 1, or 2) can be used simultaneously. X is a molecular chain having at least one reactive functional group selected from an active hydrogen-containing amino group, an epoxy group, or a mercapto group. R4 is an alkyl group, preferably a linear or branched alkyl group having 1 to 4 carbon atoms, and more preferably a linear or branched alkyl group having 1 to 2 carbon atoms. OR is any hydrolyzable group, and R is, for example, an alkyl group, preferably a linear or branched alkyl group having 1 to 4 carbon atoms, and more preferably a linear or branched alkyl group having 1 to 2 carbon atoms. Alternatively, R is, for example, an acyl group (—COR5), where R5 is preferably a linear or branched alkyl group having 1 to 4 carbon atoms, and more preferably a linear or branched alkyl group having 1 to 2 carbon atoms. As the silane coupling agent (B), for example, N-(amino-ethyl)3-aminopropyltrimethoxysilane, 3-amino-propyltrimethoxysilane, 3-glycidoxypropyltrimethoxysilane, 3-glycidoxypropylmethyldimethoxysilane, 2-(3,4 epoxycyclohexyl)ethyltriethoxysilane, 3-mercaptopropyltrimethoxysilane, or hydrolysates thereof can be used. Among them, a silane coupling agent having an amino group or an epoxy group is preferable from the viewpoint that the corrosion resistance of the resulting electrical steel sheet is superior.

[Content Ratio of Component (A) to Component (B)]

In this embodiment, the mass ratio (A/B) of the trialkoxysilane and/or the dialkoxysilane (A) to the silane coupling agent (B) is from 0.05 to 1.00. When the mass ratio is more than 1.0, the amount of the silane coupling agent (B) is insufficient, and sufficient strength and toughness of the insulating coating cannot be obtained. As a result, deterioration of tension pad resistance, and scratches or peeling of coating are likely to occur during handling. In the present disclosure, by containing the silane coupling agent (B) in an amount more than that of the trialkoxysilane and/or the dialkoxysilane (A), the tension pad resistance can be significantly improved. From this viewpoint, the mass ratio (A/B) is set to 1.00 or less, and preferably 0.50 or less. On the other hand, if the mass ratio (A/B) is too low, TIG weldability is reduced. From this viewpoint, the mass ratio (A/B) is set to 0.05 or more, and preferably 0.10 or more.

[Plate-Like Silica (C)]

The surface-treatment agent used in this embodiment includes plate-like silica (C). The plate-like silica is also referred to as leaf silica or scaly silica, which has a layered silicate structure in which a number of thin layers of $SiO_2$ are stacked. Such plate-like silica is preferably amorphous or microcrystalline. The plate-like silica can be obtained by preparing agglomerated particles of stacked primary particles of the thin layers, and pulverizing these agglomerated particles. Such plate-like silica can inhibit permeation of corrosion substances because of the layered form, and is excellent in adhesion property because of the presence of many hydroxyl groups, and in slidability because of the flexibility, as compared with common silica particles such as colloidal silica and the like. When the surface-treatment agent containing such plate-like silica is applied, the surface-treatment agent remains even on projected parts on the steel sheet surface, where the amount of application tends to be small, and uniform application of the surface-treatment agent according to the roughness of the steel sheet surface is possible. Accordingly, corrosion resistance is not inferior.

The plate-like silica (C) preferably has an average particle size of 0.08 μm or more and an aspect ratio of 10 or more. The plate-like silica (C) preferably has an average particle size of 0.9 μm or less and an aspect ratio of 100 or less. The average particle size is more preferably about 0.1 μm or more. The average particle size is more preferably about 0.5 μm or less. The aspect ratio is more preferably 20 or more. The aspect ratio is more preferably 90 or less. When the average particle size is 0.08 μm or more and the aspect ratio is 10 or more, this is effective in terms of coating morphology and provides sufficient uniformity of the coating. In addition, when the average particle size is 0.9 μm or less and the aspect ratio is 100 or less, the trialkoxysilane and/or the dialkoxysilane (A) and the silane coupling agent (B) are sufficiently incorporated into the insulating coating, and tension pad resistance becomes sufficient.

The plate-like silica (C) more preferably has an average particle size of 0.1 μm or more and an aspect ratio of 10 or more. The plate-like silica (C) more preferably has an average particle size of 0.3 μm or less and an aspect ratio of 50 or less. The reason is that excellent blanking ability can be obtained in this range. If the average particle size is 0.1 μm or more, the blanking ability is excellent because there is not a lot of powder generated by grind of the plate-like silica by blanking and the press mold is not contaminated. The larger the average particle size of the plate-like silica is, the more the metal mold is likely to be worn in blanking. When the average particle size is 0.3 μm or less, wear of the metal mold is negligible, which results in excellent blanking ability. Furthermore, if the aspect ratio is in the range of 10 to 50, the blanking ability is particularly excellent because the material is easily deformed during blanking as described above. In addition, if the aspect ratio is 50 or less, uniform coating formation more in accordance with the surface roughness of the steel sheet is possible, providing excellent corrosion resistance.

As used herein, the "average particle size" of the plate-like silica means the length obtained by averaging the major axis diameters of all the particles in the field of view in the plane perpendicular to the thickness of the plate-like silica when the cross-section of the insulating coating is observed with a scanning electron microscope (SEM) at a magnification of 20,000 times. As used herein, the "aspect ratio" of the plate-like silica means the value obtained by averaging the ratios of the major axis diameters to the maximum thicknesses of all the particles in the field of view in the plane perpendicular to the thickness of the plate-like silica when the cross-section of the insulating coating is observed with an SEM at a magnification of 20,000 times.

The content of the plate-like silica (C) is in the range of 2 mass % to 30 mass % with respect to the total mass of (A) to (E) in the surface-treatment agent. It is preferably 5 mass % or more. It is preferably 20 mass % or less. In other words, the content means a content with respect to the total mass of (A) to (D) when the surface-treatment agent does not contain a lubricant (E). If the content is 2 mass % or more, an electrical steel sheet with excellent uniform coatability can be obtained, and if the content is 30 mass % or less, corrosion resistance and tension pad resistance are not reduced.

[Polymerizable Unsaturated-Group-Containing Compound (D)]

It is important that the surface-treatment agent used in this embodiment include a polymerizable unsaturated-group-containing compound (D). Examples of the polymerizable unsaturated-group-containing compound (D) include a compound having at least one polymerizable unsaturated group selected from a vinyl group, a vinylene group, or a vinylidene group. The polymerizable unsaturated-group-containing compound (D) may be a monomer or a polymer (including an oligomer).

Examples of the polymerizable unsaturated-group-containing compound (D) as a polymer include a polyester resin, a polyether resin, an acrylic resin, an epoxy resin, and a urethane resin having at least one polymerizable unsaturated group selected from a vinyl group, a vinylene group, or a vinylidene group. The weight average molecular weight of these polymers is preferably 5,000 or more. The weight average molecular weight of these polymers is preferably 750,000 or less. As used herein, the weight average molecular weight of these polymers is calculated by gel permeation chromatography (GPC), specifically by the following method. As the measurement equipment for GPC, a high-speed GPC system (HLC-8320GPC available from Tosoh Corporation) is used. The relationship between the known weight average molecular weight and elution time is determined in advance using a standard sample, and a calibration curve that determines the weight average molecular weight from the elution time is prepared. The elution time of each polymer is measured under the following equipment and operating conditions, and the weight average molecular weight (polystyrene equivalent) is calculated by referring to the calibration curve.

<Equipment and Operating Conditions>

Separation column: TSKgelSuperAWM-H (two columns are connected in series) available from Tosoh Corporation Detector: differential refractometer Column temperature: 40° C.

Mobile phase: N,N-dimethylformamide (10 mmol/L LiBr) available from Kanto Chemical Co., Inc.

Standard sample: standard polystyrene kit (PStQuick B available from Tosoh Corporation)

Sample concentration: 0.1 mass %

Sample injection volume: 30 μL (microliter)

Flow rate: 0.5 mL/min

Examples of the polymerizable unsaturated-group-containing compound (D) as a monomer include a silane coupling agent having at least one polymerizable unsaturated group selected from a vinyl group, a vinylene group, or a vinylidene group. That is, as the polymerizable unsaturated-group-containing compound (D), silane coupling agents having a general formula $YSi(R6)_m(OR''')_{3-m}$ (where m is 0, 1, or 2) may be used alone or in combination of two or more of them simultaneously. Y is a molecular chain having at least one polymerizable unsaturated group selected from a vinyl group, a vinylene group, or a vinylidene group. R6 is an alkyl group, preferably a linear or branched alkyl group having 1 to 4 carbon atoms, and more preferably a linear or branched alkyl group having 1 to 2 carbon atoms. OR''' is any hydrolyzable group, where R''' is, for example, an alkyl group, preferably a linear or branched alkyl group having 1 to 4 carbon atoms, and more preferably a linear or branched alkyl group having 1 to 2 carbons. Also, R''' is, for example, an acyl group (—COR7), where R7 is preferably a linear or branched alkyl group having 1 to 4 carbons, and more preferably a linear or branched alkyl group having 1 to 2 carbon atoms. As such silane coupling agents, for example, vinyltrimethoxysilane, vinyltriethoxysilane, 3-methacryloxypropyltrimethoxysilane, 3-methacryloxypropyltriethoxysilane, 3-acryloxypropyltrimethoxysilane, 3-methacryloxypropylmethyldimethoxy-silane, 3-methacryloxypropylmethyldiethoxysilane, and hydrolysates thereof can be used.

Examples of monomers having a vinyl group include acrylic acid and methyl acrylate; examples of monomers having a vinylene group include fumaric acid, phthalic acid, and maleic acid; and examples of monomers having a vinylidene group include methacrylic acid and methyl methacrylate.

In this embodiment, one or more of these polymerizable unsaturated-group-containing compounds can be used.

It is important that the content of the polymerizable unsaturated-group-containing compound (D) be 2 mass % to 18 mass %, preferably 15 mass % or less, with respect to the total mass of (A) to (E) in the surface-treatment agent. In other words, the content means a content with respect to the total mass of (A) to (D) when the surface-treatment agent does not contain a lubricant (E). When the content is 2 mass % or more, sufficient adhesion strength to anaerobic acrylic adhesives is obtained, and when the content is 18 mass % or less, tension pad resistance under severe conditions is not reduced.

[Lubricant (E)]

The surface-treatment agent used in this embodiment may optionally contain a lubricant (E) to improve blanking ability and tension pad resistance. Examples of the lubricant (E) may include polyethylene wax, oxidized polyethylene wax, oxidized polypropylene wax, carnauba wax, paraffin wax, montan wax, rice wax, Teflon® wax ("Teflon" is a registered trademark in Japan, other countries, or both), carbon disulfide, and graphite. A nonionic acrylic resin may also be used as the lubricant (E). Examples of the nonionic acrylic resin include, for example, an acrylic resin emulsified with a nonionic emulsifying agent may be used. The nonionic acrylic resin may be, for example, an aqueous emulsion obtained by emulsion polymerization of a vinyl monomer such as acrylic acid, methacrylic acid, acrylate, methacrylate, or styrene in water in the presence of a nonionic surfactant (emulsifying agent) having a polyethylene oxide or polypropylene oxide in the structure. One or more of these lubricants can be used.

When the surface-treatment agent includes the lubricant (E), the content of the lubricant (E) is preferably 0.5 mass % or more with respect to the total mass of (A) to (E) in the surface-treatment agent. The content of the lubricant (E) is preferably 20 mass % or less with respect to the total mass of (A) to (E) in the surface-treatment agent. The content of the lubricant (E) is more preferably 2 mass % or more with respect to the total mass of (A) to (E) in the surface-treatment agent. The content of the lubricant (E) is more preferably 15 mass % or less with respect to the total mass of (A) to (E) in the surface-treatment agent. When the content is 0.5 mass % or more, the improvement in tension pad resistance is sufficiently obtained, and when the content is 20 mass % or less, the adhesion property to anaerobic acrylic adhesives is not degraded.

The surface-treatment agent used in this embodiment preferably consists of the components (A) to (D) or (A) to (E) other than water. However, the surface-treatment agent may optionally contain other components in an amount of 5 mass % or less with respect to the total mass of (A) to (E). The content means a content with respect to the total mass of (A) to (D) when the surface-treatment agent does not contain the lubricant (E). Examples of the other components include water-soluble solvents such as alcohols, ketones, and cellosolve, surfactants, defoamers, leveling agents, pH adjusters, and antibacterial and antifungal agents. Addition of these materials improves the drying properties, coating appearance, workability, and aesthetic surface appearance provided by the surface-treatment agent.

The surface-treatment agent used in this embodiment is obtained by mixing each of the above-described components in water, such as deionized water or distilled water. The proportion of the total mass of (A) to (E) in the surface-treatment agent may be selected as appropriate, yet it is preferably 2 mass % or more. It is preferably 16 mass % or less.

(Method of Producing an Electrical Steel Sheet with an Insulating Coating)

In this embodiment, an insulating coating is formed by applying a surface-treatment agent to at least one surface of an electrical steel sheet and heating and drying it. Examples of a method of applying the surface-treatment agent to an electrical steel sheet include roll coating, bar coating, dip coating, spray coating, and the like. An appropriate method may be selected depending on the shape or the like of the electrical steel sheet to be processed. More specifically, for example, when an electrical steel sheet is in a sheet form, roll coating, bar coating, or spray coating may be selected. Spray coating is a method in which the surface-treatment agent is sprayed onto the electrical steel sheet and then the coating amount may be adjusted by a squeeze roll or gas blown at high pressure. In a case where an electrical sheet has already been shaped into a product, a method may be employed in which the product is dipped in the surface-treatment agent, taken out of the agent, and in some cases the coating amount is adjusted by blowing away an excess of the surface-treatment agent with compressed air.

The heating temperature (maximum end-point temperature of the steel sheet) for heat-drying the surface-treatment agent applied to the surface of the electrical steel sheet is generally in the range of 80° C. to 350° C. It is preferably 100° C. or higher. It is preferably 300° C. or lower. If the heating temperature is 80° C. or higher, moisture, which is the main solvent, does not remain in the insulating coating, and corrosion resistance is not degraded. If the heating temperature is 350° C. or lower, crack generation in the insulating coating is suppressed, and corrosion resistance is not degraded. The heating time may be selected depending on the type or the like of an electrical steel sheet to be used. In terms of productivity, for example, the heating time is preferably set to 0.1 seconds or more. It is preferably set to 60 seconds or less. It is more preferably 1 second or more. It is more preferably set to 30 seconds or less.

The coating weight of the insulating coating is not particularly limited. However, it is preferably about 0.05 g/m$^2$ or more per surface. It is preferably about 5 g/m$^2$ or less per surface. The coating weight, i.e., the total solid content mass of the insulating coating can be measured from the reduction in weight after the removal of the coating through dissolution with alkali. If the coating weight is small, it can be determined from a calibration curve obtained by fluorescent X-ray analysis using a standard sample having a known coating amount as measured in advance by means of alkali dissolution. When the coating weight is 0.05 g/m$^2$ or more, the insulation property can be satisfied as well as the corrosion resistance. Meanwhile, when it is 5 g/m$^2$ or less, not only the coating adhesion property is improved, but also blistering is not caused in the coat baking, and the deterioration of coatability is not incurred. The coating weight is more preferably 0.1 g/m$^2$ or more. It is more preferably 3.0 g/m$^2$ or less. Although the insulating coating is preferably formed on both surfaces of the electrical steel sheet, the insulating coating may be formed on only one surface and another type of insulating coating may be formed on the other surface depending on the purpose.

The present disclosure will be described in more detail using the examples below. However, the disclosure is not limited to these examples.

EXAMPLES (1) Raw Material

Electrical steel sheets with a sheet thickness of 0.5 mm, A230 (JIS C 2552 (2000)), were used as specimens.

(2) Pre-Treatment (Cleaning)

To prepare a test sheet, the surface of each specimen was first treated with PALKLIN N364S available from Nihon Parkerizing Co., Ltd., to remove the oil and dirt thereon. Then, the surface of each specimen was rinsed with tap water. Then, after confirming that the surface having been 100% wetted with water, pure water (deionized water) was further poured over the specimen, which in turn was dried in an oven at 100° C., and the resulting product was used as a test sheet.

(3) Surface-Treatment Agent

Components were mixed in water with the compositions (mass ratios) listed in Table 1 to obtain respective surface-treatment agents. The concentration of the total mass of components (A) to (E) relative to the surface-treatment agent was 6.3 g/L. Next, the compounds listed in Table 1 will be described.

[Trialkoxysilane/Dialkoxysilane (A)]
  A1: methyltrimethoxysilane
  A2: dimethyldimethoxysilane
[Silane Coupling Agent (B)]
  B1: 3-glycidoxypropyltrimethoxysilane
  B2: 3-aminopropyltrimethoxysilane
  B3: N-(aminoethyl)3-aminopropyltrimethoxysilane
[Plate-Like Silica (C)]
  C1: average particle size 0.2 μm, aspect ratio 20
  C2: average particle size 0.5 μm, aspect ratio 50
  C3: average particle size 0.1 μm, aspect ratio 10
[Polymerizable Unsaturated-Group-Containing Compound (D)]
  D1: acrylate-modified urethane resin (weight average molecular weight: 7,500)
  D2: vinyltrimethoxysilane
  D3: 3-methacryloxypropyltrimethoxysilane
  D4: fumaric acid
  D5: (meth)acryloyl group-modified urethane resin (weight average molecular weight: 7,500)
  D6: acryloyl group-modified urethane resin (weight average molecular weight: 500,000)
[Lubricant (E)]
  E1: polyethylene wax (CHEMIPEARL®900; "CHEMIPEARL" is a registered trademark in Japan, other countries, or both.)

(4) Treatment Method

After performing annealing for achieving predetermined material properties using a continuous annealing line, each surface-treatment agent was applied by roll coating in a stage where each steel sheet had been cooled, and drying was performed in an oven such that the maximum end-point temperature of the steel sheet was 200° C., thereby forming an insulating coating with a coating weight of 0.5 g/m$^2$ on both surfaces of the steel sheet. As a roll coating condition, a full reverse 3-roll coater system was used. The maximum end-point temperature indicates the maximum arrival temperature of the test sheet surface.

(5) Evaluation

[Adhesion Properties]

The size of each specimen for adhesion strength evaluation was 25 mm×100 mm, and shear tensile specimens were prepared according to DIN EN 1465 (2009-07) and subjected to shear tensile test. Specifically, the tensile shear strength was determined by bonding the insulating coating parts of two sheets of specimens with an adhesive, applying a tensile load in a direction parallel to the bonded faces, and dividing the maximum load at which the bonded faces were broken by the bonding area. The adhesive used was AS5334, an anaerobic acrylic adhesive available from Asec Co., Ltd., and the activator used was AS8000 available from Asec Co., Ltd., The tensile shear strength was evaluated according to the following criteria. The results are listed in Table 1. A score of "Excellent" or "Good" was considered acceptable.

(Criteria)
  Excellent: 8 MPa or more
  Good: 5 MPa or more and less than 8 MPa
  Poor: less than 5 MPa

[Corrosion Resistance]

Two sheets of 50 mm×50 mm punched specimens were stacked on top of each other and 200 g of weight was placed on top of them, and left in a constant temperature and humidity chamber at a temperature of 50° C. and a relative humidity of 80% for 2 weeks. The average rust generation area ratio on the two overlapped surfaces was visually measured. The results are listed in Table 1. A score of "Excellent" or "Good" was considered acceptable.

(Criteria)

Excellent: 0%

Good: more than 0% and less than 5%

Poor: 5% or more

[Tension Pad Resistance]

Using a tension pad with an area of 10 mm×10 mm, the surface of the insulating coating was rubbed 100 times back and forth with a load of 19.6 N (2.0 kgf) using a rubbing tester available from Taihei Rika Kogyo Co., Ltd. The coating weight of each rubbed portion and the vicinity thereof was measured to calculate the residual rate of each insulating coating after 100 reciprocal rubbings. The coating weight was determined from the calibration curve obtained by measuring the X-ray fluorescence intensity of Si and using a standard sheet with a known coating weight. The results are listed in Table 1. A score of "Excellent" or "Good" was considered acceptable.

(Criteria)

Excellent: 90% or more

Good: 70% or more and less than 90%

Poor: less than 70%

[Tension Pad Resistance Under Severe Conditions]

The tension pad resistance was evaluated in the same manner and on the same criteria as above, except that the number of reciprocal rubbings was changed from 100 to 200. The results are listed in Table 1. A score of "Excellent" or "Good" was considered acceptable.

TABLE 1

| | | | | | | | | | | | Performance | | | | |
|---|---|---|---|---|---|---|---|---|---|---|---|---|---|---|---|
| | Composition of surface-treatment agent | | | | | | | | | | | | | Tension pad | |
| | Type | | | | | Mass ratio | Mass (%) | | | Adhesion | Corrosion | Tension pad | resistance under | |
| No. | A | B | C | D | E | A/B | C | D | E | property | resistance | resistance | severe conditions | Remarks |
| 1 | A1 | B1 | C1 | D1 | — | 0.25 | 10 | 5 | — | Excellent | Excellent | Excellent | Excellent | Example |
| 2 | A2 | B1 | C1 | D1 | — | 0.25 | 10 | 5 | — | Excellent | Excellent | Excellent | Excellent | Example |
| 3 | A1 | B2 | C1 | D1 | — | 0.25 | 10 | 5 | — | Excellent | Excellent | Excellent | Excellent | Example |
| 4 | A1 | B3 | C1 | D1 | — | 0.25 | 10 | 5 | — | Excellent | Excellent | Excellent | Excellent | Example |
| 5 | A1 | B1 | C2 | D1 | — | 0.25 | 10 | 5 | — | Excellent | Excellent | Excellent | Excellent | Example |
| 6 | A1 | B1 | C3 | D1 | — | 0.25 | 10 | 5 | — | Excellent | Excellent | Excellent | Excellent | Example |
| 7 | A1 | B1 | C1 | D1 | — | 0.25 | 10 | 5 | — | Excellent | Excellent | Excellent | Excellent | Example |
| 8 | A1 | B1 | C1 | D2 | — | 0.25 | 10 | 5 | — | Excellent | Excellent | Excellent | Excellent | Example |
| 9 | A1 | B1 | C1 | D3 | — | 0.25 | 10 | 5 | — | Excellent | Excellent | Excellent | Excellent | Example |
| 10 | A1 | B1 | C1 | D4 | — | 0.25 | 10 | 5 | — | Excellent | Excellent | Excellent | Excellent | Example |
| 11 | A1 | B1 | C1 | D5 | — | 0.25 | 10 | 5 | — | Excellent | Excellent | Excellent | Excellent | Example |
| 12 | A1 | B1 | C1 | D6 | — | 0.25 | 10 | 5 | — | Excellent | Excellent | Excellent | Excellent | Example |
| 13 | A1 | B1 | C1 | D1 | E1 | 0.25 | 10 | 5 | 2 | Excellent | Excellent | Excellent | Excellent | Example |
| 14 | A1 | B1 | C1 | D1 | — | 0.05 | 10 | 5 | — | Excellent | Excellent | Excellent | Excellent | Example |
| 15 | A1 | B1 | C1 | D1 | — | 0.50 | 10 | 5 | — | Excellent | Excellent | Excellent | Excellent | Example |
| 16 | A1 | B1 | C1 | D1 | — | 1.00 | 10 | 5 | — | Excellent | Excellent | Excellent | Excellent | Example |
| 17 | A1 | B1 | C1 | D1 | — | 0.25 | 5 | 5 | — | Excellent | Excellent | Excellent | Excellent | Example |
| 18 | A1 | B1 | C1 | D1 | — | 0.25 | 15 | 5 | — | Excellent | Good | Good | Good | Example |
| 19 | A1 | B1 | C1 | D1 | — | 0.25 | 20 | 5 | — | Excellent | Good | Good | Good | Example |
| 20 | A1 | B1 | C1 | D1 | — | 0.25 | 30 | 5 | — | Excellent | Good | Good | Good | Example |
| 21 | A1 | B1 | C1 | D1 | — | 0.25 | 10 | 2 | — | Good | Excellent | Excellent | Excellent | Example |
| 22 | A1 | B1 | C1 | D1 | — | 0.25 | 10 | 10 | — | Excellent | Good | Good | Good | Example |
| 23 | A1 | B1 | C1 | D1 | — | 0.25 | 10 | 15 | — | Excellent | Good | Good | Good | Example |
| 24 | A1 | B1 | C1 | D1 | — | 0.25 | 10 | 18 | — | Excellent | Good | Good | Good | Example |
| 25 | A1 | B1 | C1 | D1 | E1 | 0.25 | 10 | 18 | 2 | Excellent | Good | Excellent | Excellent | Example |
| 26 | A1 | B1 | C1 | D1 | E1 | 0.25 | 10 | 18 | 5 | Excellent | Good | Excellent | Excellent | Example |
| 27 | A1 | B1 | C1 | D1 | E1 | 0.25 | 10 | 18 | 10 | Excellent | Good | Excellent | Excellent | Example |
| 28 | A1 | B1 | C1 | D1 | E1 | 0.25 | 10 | 18 | 15 | Good | Good | Excellent | Excellent | Example |
| 29 | A1 | B1 | C1 | D1 | E1 | 0.25 | 10 | 18 | 20 | Good | Good | Excellent | Excellent | Example |
| 30 | A1 | B1 | C1 | D2 | — | 0.25 | 10 | 2 | — | Good | Excellent | Excellent | Excellent | Example |
| 31 | A1 | B1 | C1 | D2 | — | 0.25 | 10 | 10 | — | Excellent | Good | Good | Good | Example |
| 32 | A1 | B1 | C1 | D2 | — | 0.25 | 10 | 15 | — | Excellent | Good | Good | Good | Example |
| 33 | A1 | B1 | C1 | D2 | — | 0.25 | 10 | 18 | — | Excellent | Good | Good | Good | Example |
| 34 | A1 | B1 | C1 | D3 | — | 0.25 | 10 | 2 | — | Good | Excellent | Excellent | Excellent | Example |
| 35 | A1 | B1 | C1 | D3 | — | 0.25 | 10 | 10 | — | Excellent | Good | Good | Good | Example |
| 36 | A1 | B1 | C1 | D3 | — | 0.25 | 10 | 15 | — | Excellent | Good | Good | Good | Example |
| 37 | A1 | B1 | C1 | D3 | — | 0.25 | 10 | 18 | — | Excellent | Good | Good | Good | Example |
| 38 | A1 | B1 | C1 | D4 | — | 0.25 | 10 | 2 | — | Good | Excellent | Excellent | Excellent | Example |
| 39 | A1 | B1 | C1 | D4 | — | 0.25 | 10 | 10 | — | Excellent | Good | Good | Good | Example |
| 40 | A1 | B1 | C1 | D4 | — | 0.25 | 10 | 15 | — | Excellent | Good | Good | Good | Example |
| 41 | A1 | B1 | C1 | D4 | — | 0.25 | 10 | 18 | — | Excellent | Good | Good | Good | Example |
| 42 | A1 | B1 | C1 | D5 | — | 0.25 | 10 | 2 | — | Good | Excellent | Excellent | Excellent | Example |
| 43 | A1 | B1 | C1 | D5 | — | 0.25 | 10 | 10 | — | Excellent | Good | Good | Good | Example |
| 44 | A1 | B1 | C1 | D5 | — | 0.25 | 10 | 15 | — | Excellent | Good | Good | Good | Example |
| 45 | A1 | B1 | C1 | D5 | — | 0.25 | 10 | 18 | — | Excellent | Good | Good | Good | Example |
| 46 | A1 | B1 | C1 | D6 | — | 0.25 | 10 | 2 | — | Good | Excellent | Excellent | Excellent | Example |
| 47 | A1 | B1 | C1 | D6 | — | 0.25 | 10 | 10 | — | Excellent | Good | Good | Good | Example |
| 48 | A1 | B1 | C1 | D6 | — | 0.25 | 10 | 15 | — | Excellent | Good | Good | Good | Example |
| 49 | A1 | B1 | C1 | D6 | — | 0.25 | 10 | 18 | — | Excellent | Good | Good | Good | Example |
| 50 | A1 | B1 | C1 | D1 | — | 0.25 | 10 | 20 | — | Excellent | Good | Good | Poor | Comparative example |
| 51 | A1 | B1 | C1 | D3 | — | 0.25 | 10 | 3 | — | Good | Excellent | Excellent | Excellent | Example |
| 52 | A1 | B1 | C1 | D4 | — | 0.25 | 10 | 13 | — | Excellent | Good | Good | Good | Example |
| 53 | A1 | B1 | C1 | D5 | — | 0.25 | 10 | 30 | — | Excellent | Good | Good | Poor | Comparative example |
| 54 | A1 | B1 | C1 | — | — | 0.25 | 10 | 0 | — | Poor | Excellent | Excellent | Excellent | Comparative example |

TABLE 1-continued

| | | | | | | | | | | | Performance | | |
| | Composition of surface-treatment agent | | | | | | | | | | | | Tension pad | |
| | | Type | | | | Mass ratio | Mass (%) | | | Adhesion | Corrosion | Tension pad | resistance under | |
| No. | A | B | C | D | E | A/B | C | D | E | property | resistance | resistance | severe conditions | Remarks |
|---|---|---|---|---|---|---|---|---|---|---|---|---|---|---|
| 55 | A1 | B1 | C1 | D1 | — | 0.25 | 10 | 1 | — | Poor | Excellent | Excellent | Excellent | Comparative example |
| 56 | A1 | B1 | C1 | D1 | — | 0.25 | 10 | 22 | — | Excellent | Good | Good | Poor | Comparative example |
| 57 | A1 | B1 | C1 | D1 | — | 0.25 | 10 | 25 | — | Excellent | Good | Good | Poor | Comparative example |
| 58 | A1 | B1 | C1 | D1 | — | 0.25 | 10 | 30 | — | Excellent | Good | Good | Poor | Comparative example |

INDUSTRIAL APPLICABILITY

The electrical steel sheet with an insulating coating disclosed herein is suitable as the raw material for iron cores of automobile motors or electric equipment because it has excellent bonding strength to an anaerobic acrylic adhesive, corrosion resistance, and tension pad resistance.

The invention claimed is:

1. An electrical steel sheet with an insulating coating formed by applying a surface-treatment agent to at least one surface of the electrical steel sheet and drying the surface-treatment agent, wherein the surface-treatment agent contains:

trialkoxysilane and/or dialkoxysilane (A) having a substituent other than an alkoxy group bound to Si which consists of at least one non-reactive substituent selected from hydrogen, an alkyl group, or a phenyl group;

a silane coupling agent (B) that does not contain a polymerizable unsaturated group in its structure;

plate-like silica (C) having an average particle size of 0.08 μm to 0.9 μm and an aspect ratio of 10 to 100;

a polymerizable unsaturated-group-containing compound (D); and water, within a range satisfying the following conditions (1) to (3):

(1) a mass ratio (A/B) of the trialkoxysilane and/or the dialkoxysilane (A) to the silane coupling agent (B) is from 0.05 to 1.00;

(2) a content of the plate-like silica (C) is 2 mass % to 30 mass % with respect to a total mass of (A) to (D) in the surface-treatment agent; and (3) a content of the polymerizable unsaturated-group-containing compound (D) is 2 mass % to 18 mass % with respect to the total mass of (A) to (D) in the surface-treatment agent.

2. An electrical steel sheet with an insulating coating formed by applying a surface-treatment agent to at least one surface of the electrical steel sheet and drying the surface-treatment agent, wherein the surface-treatment agent contains:

trialkoxysilane and/or dialkoxysilane (A) having a substituent other than an alkoxy group bound to Si which consists of at least one non-reactive substituent selected from hydrogen, an alkyl group, or a phenyl group;

a silane coupling agent (B) that does not contain a polymerizable unsaturated group in its structure;

plate-like silica (C) having an average particle size of 0.08 μm to 0.9 μm and an aspect ratio of 10 to 100;

a polymerizable unsaturated-group-containing compound (D);

a lubricant (E); and water, within a range satisfying the following conditions (1) to (4):

(1) a mass ratio (A/B) of the trialkoxysilane and/or the dialkoxysilane (A) to the silane coupling agent (B) is from 0.05 to 1.00;

(2) a content of the plate-like silica (C) is 2 mass % to 30 mass % with respect to a total mass of (A) to (E) in the surface-treatment agent;

(3) a content of the polymerizable unsaturated-group-containing compound (D) is 2 mass % to 18 mass % with respect to the total mass of (A) to (E) in the surface-treatment agent; and (4) a content of the lubricant (E) is 0.5 mass % to 20 mass % with respect to the total mass of (A) to (E) in the surface-treatment agent.

* * * * *